No. 676,961. Patented June 25, 1901.
J. C. PARKS.
FIREMAN'S HOOK.
(Application filed Oct. 25, 1900.)
(No Model.)
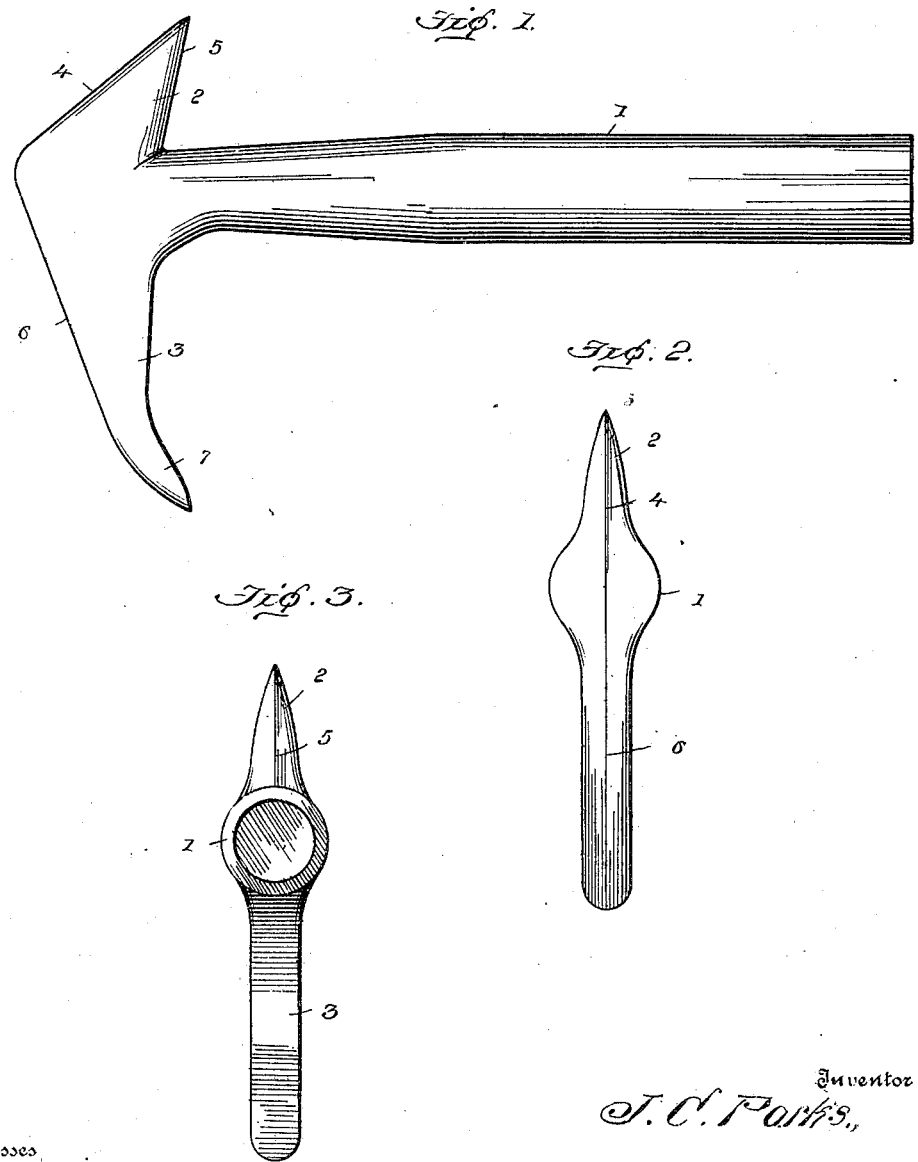

UNITED STATES PATENT OFFICE.

JOHN C. PARKS, OF BROCKTON, MASSACHUSETTS, ASSIGNOR OF ONE-HALF TO H. G. WINSOR, OF SAME PLACE.

FIREMAN'S HOOK.

SPECIFICATION forming part of Letters Patent No. 676,961, dated June 25, 1901.

Application filed October 25, 1900. Serial No. 34,345. (No model.)

*To all whom it may concern:*

Be it known that I, JOHN C. PARKS, a citizen of the United States, residing at Brockton, in the county of Plymouth and State of Massachusetts, have invented new and useful Improvements in Firemen's Hooks, of which the following is a specification.

My invention relates to plaster-hooks adapted for the use of firemen in removing laths and plaster from walls and ceilings of burning buildings; and the object of the invention is to provide a device of this character which will be of simple, inexpensive, and durable construction and effective in use.

The construction of the improvement will be fully described hereinafter in connection with the accompanying drawings, which form a part of this specification, and its novel features will be defined in the appended claims.

In the drawings, Figure 1 is a side elevation of a device embodying the invention. Fig. 2 is a front edge view of the same, and Fig. 3 is an elevation of the rear edge of the hook.

The reference-numeral 1 designates a hollow shank or ferrule, which is adapted to be secured upon the end of a suitable handle.

Integral with the shank or ferrule 1 is the head of the device, comprising a short hook or prong 2, projecting from the upper side of the shank or ferrule, and an elongated hook or prong 3, depending from the under side of the shank or ferrule in the vertical plane of the upper prong or hook 2. The front edge 4 of the upper hook 2 is inclined upwardly and is sharpened to form a cutting edge, and the rear edge 5 of said prong or hook 2 is also sharpened, forming a cutting edge. The front edge of the elongated prong 3 of the device inclines downward and is sharpened to form a cutting edge 6. The lower end or point 7 of the depending prong of the implement is curved rearwardly to facilitate its engagement with the material to be removed.

By reference to Figs. 2 and 3 it will be observed that the sides of the upper prong 2 taper from the base upward, thus imparting a wedge shape to said prong and adapting it to be readily inserted between adjacent laths.

The entire head of the implement, which consists of the prongs 2 and 3, is of wedge shape, thus adapting it to be easily forced between the laths of a ceiling, after which by partly turning the handle the prongs or hooks are firmly engaged and the laths and plaster may be quickly pulled away from their supports.

The curved end 7 of the elongated prongs facilitates the insertion thereof into a wall in order to obtain a bearing-surface for the use of the implement.

The sharpened edges 4 and 5 of the short upper hook 2 adapt the device for cutting metal ceiling, roofs, or wire lathing.

Inasmuch as the entire device is constructed of a single integral piece of metal, it is strong and durable and effective for the purpose for which it is designed.

I claim—

1. A plaster-hook, comprising a shank or ferrule; an upwardly-projecting prong or hook having its front edge inclined upward and sharpened, and its rear side reduced to a cutting edge; a depending elongated prong or hook having its front edge inclined rearward and its lower end curved rearward.

2. A plaster-hook comprising a shank or ferrule; an integral head of wedge shape comprising a short upwardly-inclined prong provided with cutting edges; and a depending elongated prong formed with a cutting edge and having its lower end curved rearward.

In testimony whereof I affix my signature in presence of two witnesses.

JOHN C. PARKS.

Witnesses:
ARTHUR H. EMERSON,
HORACE B. EMERSON.